United States Patent
Zheng et al.

(10) Patent No.: US 9,618,709 B2
(45) Date of Patent: Apr. 11, 2017

(54) HYBRID INTEGRATION OF EDGE-COUPLED CHIPS

(71) Applicant: Oracle International Corporation, Redwood City (CA)

(72) Inventors: Xuezhe Zheng, San Diego, CA (US); Ivan Shubin, San Diego, CA (US); Ying Luo, San Diego, CA (US); Guoliang Li, San Diego, CA (US); Ashok V. Krishnamoorthy, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 660 days.

(21) Appl. No.: 14/060,136

(22) Filed: Oct. 22, 2013

(65) Prior Publication Data

US 2016/0170158 A1  Jun. 16, 2016

(51) Int. Cl.
*G02B 6/42* (2006.01)
*G02B 6/14* (2006.01)

(52) U.S. Cl.
CPC ............ *G02B 6/4224* (2013.01); *G02B 6/14* (2013.01)

(58) Field of Classification Search
None
See application file for complete search history.

(56) References Cited

U.S. PATENT DOCUMENTS

| | | | | |
|---|---|---|---|---|
| 4,022,602 A * | 5/1977 | Pavlopoulos | ............ | G02B 6/13 385/132 |
| 5,366,573 A * | 11/1994 | Bayer | ................. | H01L 21/6835 156/236 |
| 7,653,106 B2 * | 1/2010 | Arimoto | ............... | H01S 5/0424 372/46.011 |
| 2007/0245836 A1 * | 10/2007 | Vaganov | ................. | G01L 1/044 73/862.621 |
| 2008/0304802 A1 * | 12/2008 | Watanabe | ................ | G02B 6/42 385/134 |
| 2011/0069973 A1 * | 3/2011 | Krishnamoorthy | ...... | G02B 6/12 398/200 |
| 2011/0135265 A1 * | 6/2011 | Park | ......................... | G02B 6/13 385/129 |

* cited by examiner

*Primary Examiner* — Bilkis Jahan
*Assistant Examiner* — Victor Barzykin
(74) *Attorney, Agent, or Firm* — Park, Vaughan, Fleming & Dowler LLP (57) ABSTRACT

A technique for fabricating a hybrid optical source is described. During this fabrication technique, a III-V compound-semiconductor active gain medium is integrated with a silicon-on-insulator (SOI) chip (or wafer) using edge coupling to form a co-planar hybrid optical source. Using a backside etch-assisted cleaving technique, and a temporary transparent substrate with alignment markers, a III-V compound-semiconductor chip with proper edge polish and coating can be integrated with a processed SOI chip (or wafer) with accurate alignment. This fabrication technique may significantly reduce the alignment complexity when fabricating the hybrid optical source, and may enable wafer-scale integration.

19 Claims, 10 Drawing Sheets

FIG. 1

SIDE VIEW

TOP VIEW

FIG. 2

SIDE VIEW

TOP VIEW

SIDE VIEW

HYBRID INTEGRATION OF EDGE-COUPLED CHIPS

GOVERNMENT LICENSE RIGHTS

This invention was made with Government support under Agreement No. HR0011-08-9-0001 awarded by DARPA. The Government has certain rights in the invention.

BACKGROUND

Field

The present disclosure generally relates to the fabrication of a hybrid optical source. More specifically, the present disclosure relates to fabrication of a hybrid optical source with two co-planar, edge-coupled optical devices coupled to a substrate.

Related Art

Optical signaling based on silicon photonics has the potential to alleviate off-chip bandwidth bottlenecks, as well as to provide low latency intra-chip and chip-to-chip communication. Optical interconnects with these capabilities can facilitate new system architectures that include multiple chips, with multi-threaded cores. These optical interconnects can provide: high-bandwidth, low-latency and energy-efficient data communication.

In the last few years, significant progress has been made in developing low-cost components for use in inter-chip and intra-chip silicon-photonic links, including: high-bandwidth efficient silicon modulators, low-loss optical waveguides, wavelength-division-multiplexing (WDM) components, and high-speed CMOS optical-waveguide photodetectors. However, producing a low-cost, efficient optical source (such as a laser) on silicon remains a challenge and poses an obstacle to implementing silicon-photonic links.

In particular, because of its indirect band-gap structure, silicon is a poor material for light emission and, therefore, usually has a low optical gain. In spite of ongoing efforts to enhance the light-emitting efficiency and optical gain of silicon, electrically pumped room-temperature continuous-wave (CW) lasing remains an elusive goal. Recent research efforts have included attempts to use germanium directly grown on silicon as a gain medium. However, high tensile strain and high doping are typically used to make germanium direct band gap, which can significantly reduce the wall-plug efficiency (WPE) of a resulting optical source.

Another approach for building lasers on silicon is to use III-V compound-semiconductor materials on silicon for efficient light emission. However, epitaxial growth of III-V compound semiconductors on silicon is typically difficult because of the large lattice and thermal mismatch between silicon and the III-V compound semiconductors, which often severely limits the laser efficiency and reliability. One solution to these challenges is hybrid wafer integration of III-V compound semiconductors with silicon. For example, evanescent-coupled hybrid lasers have been successfully demonstrated using wafer bonding of indium-phosphide optical devices to silicon via either oxide-to-oxide fusion bonding or benzocyclobutene bonding. Nonetheless, the WPE of these hybrid optical sources has been limited to around 5% because of taper loss, carrier-injection efficiency and thermal impedance. In addition, new fabrication techniques are needed to allow bonding of III-V compound semiconductors with active silicon devices that include multiple layers of metal interconnects and interlayer dielectrics.

Other proposed hybrid optical sources employ surface-normal coupling of a III-V compound-semiconductor gain medium with optical waveguides on silicon. For example, a surface-normal optical coupler on a III-V compound-semiconductor can be implemented using an etched optical waveguide facet, and a surface-normal optical coupler on silicon can be implemented using grating optical couplers. In principle, with an optical mode field diameter or optical mode sizes of 5 µm, grating optical couplers with an insertion loss of around −1 dB can be achieved, allowing efficient optical coupling of light into and out of a submicron, silicon optical waveguide. However, such a large optical mode field diameter is typically not available for III-V compound-semiconductor optical waveguide designs, which usually have optical modes sizes of around 1 µm. At these optical mode sizes, the optical coupling loss of an etched optical waveguide facet or mirror with perfect alignment is larger than 3 dB.

Alternatively, proposed hybrid optical sources employing edge-to-edge butt-coupling of a III-V compound-semiconductor gain medium with silicon optical waveguides can provide similar electrical injection efficiency and thermal impedance as conventional III-V compound-semiconductor lasers. For example, external cavity lasers using this hybrid integration technique have been successfully demonstrated with a WPE of up to 9.5%. However, because of optical mode mismatches between the III-V compound-semiconductor and silicon optical waveguides, optical mode spot-size converters on either or both of the III-V compound-semiconductor optical device and the silicon-based optical device are typically needed. In addition, accurate alignment (with submicron alignment tolerances) is usually needed for efficient optical coupling. Achieving such six-axis alignment in a high-yield and low-cost fabrication technique has proven to be very difficult.

Hence, what is needed is a technique for fabricating a hybrid optical source without the problems described above.

SUMMARY

One embodiment of the present disclosure provides a method for fabricating a co-planar hybrid optical source. During the method, a temporary substrate having alignment markers is disposed on a first optical device having a first semiconductor substrate, where the alignment markers are aligned with a first optical waveguide in the first optical device. Then, the second optical device having a second semiconductor substrate is attached to the temporary substrate, where the alignment markers are used to align the first optical waveguide with a second optical waveguide in the second optical device, and where the second semiconductor substrate is different than the first semiconductor substrate. Moreover, the first optical device and the second optical device are coupled to a substrate. Next, the temporary substrate is removed.

Note that the temporary substrate may include photoresist and/or epoxy. Moreover, the temporary substrate may be optically transparent (e.g., for light in an infrared or a visible band of wavelengths).

Furthermore, the first optical waveguide may be optically butt coupled to the second optical waveguide. In some embodiments, at least one of the first optical waveguide and the second optical waveguide includes a spot-size converter to expand an optical mode of an optical signal conveyed in the first optical waveguide and the second optical waveguide.

Additionally, the first semiconductor substrate may include a III-V semiconductor.

In some embodiments, the second optical device includes: a buried-oxide layer disposed on the second semiconductor substrate; and a semiconductor layer disposed on the buried-oxide layer, where the semiconductor layer includes the second optical waveguide. For example, the second semiconductor substrate, the buried-oxide layer, and the semiconductor layer may comprise a silicon-on-insulator technology. Thus, the second semiconductor substrate may include silicon.

Note that a thickness of the first optical device may be less than a thickness of the second optical device.

The temporary substrate may align the first optical device and the second optical device in a direction perpendicular to a plane of the first semiconductor substrate. Moreover, the first optical device and the second optical device may be aligned in a first direction in a plane of the first semiconductor substrate by reducing a separation between adjacent edges of the first semiconductor substrate and the second semiconductor substrate. Furthermore, the first optical device and the second optical device may be aligned in a second direction in the plane using the alignment markers.

In some embodiments, prior to attaching the second optical device to the temporary substrate, a photoresist layer is disposed on a back side of the second semiconductor substrate, where the second semiconductor substrate has a thickness.

Then, a trench, having sides with a length, a width and a depth, is defined in the second semiconductor substrate, where the length is approximately perpendicular to a symmetry axis of the second optical waveguide, and where the depth is less than the thickness. For example, the trench may be defined using a deep reactive ion etch. Next, the second semiconductor substrate is cleaved to define a surface by applying a force proximate to the trench. Note that prior to disposing the photoresist layer on the back side of the second semiconductor substrate, the thickness may be thinned to less than a predefined value, such as 300 μm.

Moreover, the second optical waveguide may be designed to convey an optical signal having a wavelength, and the surface may have a roughness significantly less than the wavelength.

Furthermore, the first optical device and the second optical device may be coupled to the substrate using epoxy and/or conductive epoxy.

Additionally, the substrate may include: silicon, glass, plastic, and/or ceramic.

In some embodiments, the co-planar hybrid optical source is fabricated prior to singulating the first optical device and the second optical device from wafers.

Another embodiment provides the hybrid optical source.

Another embodiment provides a system that includes the hybrid optical source.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a co-planar hybrid optical source, a system that includes the hybrid optical source, and a method for fabricating the hybrid optical source are described. During this fabrication technique, a III-V compound-semiconductor active gain medium is integrated with a silicon-on-insulator (SOI) chip (or wafer) using edge coupling to form a co-planar hybrid optical source. Using a backside etching-assisted cleaving technique, and a temporary transparent substrate with alignment markers, a III-V compound-semiconductor chip with proper edge polish and coating can be integrated with a processed SOI chip (or wafer) with accurate alignment. This fabrication technique may significantly reduce the alignment complexity when fabricating the hybrid optical source, and may enable wafer-scale integration.

The fabrication technique may allow fabrication of a high-yield, low-cost and high-performance hybrid optical source. Consequently, the fabrication technique may enable the use of optical interconnects based on silicon-photonic devices and, thus, improved performance in applications such as high-performance computing.

Figure 1:
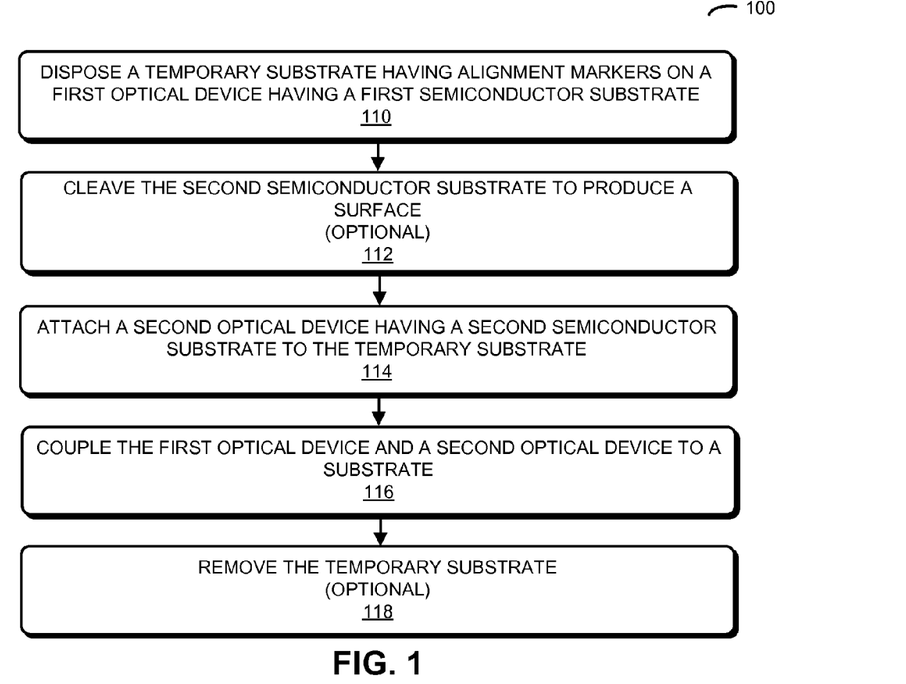
FIG. 1 is a flow diagram illustrating a method for fabricating a co-planar hybrid optical source in accordance with an embodiment of the present disclosure.

We now describe embodiments of the fabrication technique. FIG. 1 presents a flow diagram illustrating a method 100 for fabricating a co-planar hybrid optical source. During the method, a temporary substrate having alignment markers is disposed on a first optical device having a first semiconductor substrate (operation 110), where the alignment markers are aligned with a first optical waveguide in the first optical device. Note that the temporary substrate may include photoresist and/or epoxy. Moreover, the temporary substrate may be optically transparent (e.g., for light in an infrared or a visible band of wavelengths).

Then, the second optical device having a second semiconductor substrate is attached to the temporary substrate (operation 114), where the alignment markers are used to align the first optical waveguide with a second optical waveguide in the second optical device, and where the second semiconductor substrate is different than the first semiconductor substrate. In particular, the first semiconductor substrate may include a III-V semiconductor and/or the second optical device may include: a buried-oxide layer disposed on the second semiconductor substrate; and a semiconductor layer disposed on the buried-oxide layer, where the semiconductor layer includes the second optical waveguide. For example, the second semiconductor substrate, the buried-oxide layer, and the semiconductor layer may comprise a silicon-on-insulator technology. Thus, the second semiconductor substrate may include silicon.

Furthermore, the first optical waveguide may be optically butt coupled to the second optical waveguide. In some embodiments, at least one of the first optical waveguide and the second optical waveguide includes a spot-size converter to expand an optical mode of an optical signal conveyed in the first optical waveguide and the second optical waveguide.

The temporary substrate may align the first optical device and the second optical device in a direction perpendicular to a plane of the first semiconductor substrate. Moreover, the first optical device and the second optical device may be aligned in a first direction in a plane of the first semiconductor substrate by reducing a separation between adjacent edges of the first semiconductor substrate and the second semiconductor substrate. Furthermore, the first optical device and the second optical device may be aligned in a second direction in the plane using the alignment markers. Alignment in the second direction may be facilitated by an optically transparent temporary substrate, which may allow the first optical waveguide and the second optical waveguide to be visualized.

Next, the first optical device and the second optical device are coupled to a substrate (operation 116). For example, the first optical device and the second optical device may be coupled to the substrate using epoxy and/or conductive epoxy.

Additionally, the substrate may include: silicon, glass, plastic, and/or ceramic. To facilitate the coupling (operation 116) while maintaining the alignment, a thickness of the first optical device may be less than a thickness of the second optical device (as described further below with reference to FIGS. 6-9, this may also facilitate wafer-scale integration).

Moreover, the temporary substrate is optionally removed (operation 118).

In some embodiments, prior to attaching the second optical device to the temporary substrate (operation 114), the second semiconductor substrate is optionally cleaved to produce a surface (operation 112), such as an optical facet. In particular, a photoresist layer may be optionally disposed on a back side of the second semiconductor substrate, where the second semiconductor substrate has a thickness. Then, a trench, having sides with a length, a width and a depth, may be optionally defined in the second semiconductor substrate, where the length is approximately perpendicular to a symmetry axis of the second optical waveguide, and where the depth is less than the thickness. For example, the trench may be defined using a deep reactive ion etch. Next, the second semiconductor substrate may be optionally cleaved to define a surface by applying a force proximate to the trench. Note that prior to disposing the photoresist layer on the back side of the second semiconductor substrate, the thickness may be thinned to less than a predefined value, such as 300 µm. The resulting surface may have high optical quality. For example, the second optical waveguide may be designed to convey an optical signal having a wavelength, and the surface may have a roughness significantly less than the wavelength.

In general, low-loss edge-coupling of a III-V compound-semiconductor optical waveguide with a silicon optical waveguide typically requires: optical mode matching, an optical coupling edge with high surface quality, and accurate alignment of the optical waveguides. Typically, a III-V compound-semiconductor optical waveguide has an optical mode size around 1 µm in diameter vertically, which matches neither of the two popular SOI platforms for silicon photonics: a silicon semiconductor layer having a thickness of approximately 0.25-0.3 µm, and a silicon semiconductor layer having a thickness of 3 µm. Usually, spot-size converters are needed on the side with the smaller optical mode size to up-convert the optical mode size to match the other side with the larger optical mode size. Consequently, in order to integrate a III-V compound-semiconductor active medium with an approximately 0.25-0.3 µm SOI platform, spot-size converters are often used on the SOI chip.

In order to expand the optical mode both laterally and vertically, a spot-size converter based on a silicon optical waveguide having an inverse taper followed by a larger dielectric optical waveguide with lower index-of-refraction contrast can be used. Moreover, in order to obtain optical coupling edges with good surface quality, cleaving or dicing and polishing are typically used, which often forces integration to be performed at the singulated chip level. Furthermore, accurate alignment of III-V compound-semiconductor and silicon optical waveguides typically requires six-axis high-resolution active alignment with the III-V compound-semiconductor optical devices turned on, which can be time-consuming and expensive.

As described below with reference to FIG. 10, backside etching-assisted cleaving can create a high-quality optical coupling edge on SOI without using polishing. In the following discussion of FIGS. 2-5, this cleaving technique may be used in a fabrication technique that facilitates fabrication of a hybrid optical source with a much less complicated alignment process. In addition, as described further below with reference to FIGS. 6-9, this cleaving technique may also be used in a wafer-scale fabrication technique that allows multiple openings to be created in a wafer. These openings can be accurately defined by backside photolithography and terminated at the SOI optical waveguide facets.

Figure 2:
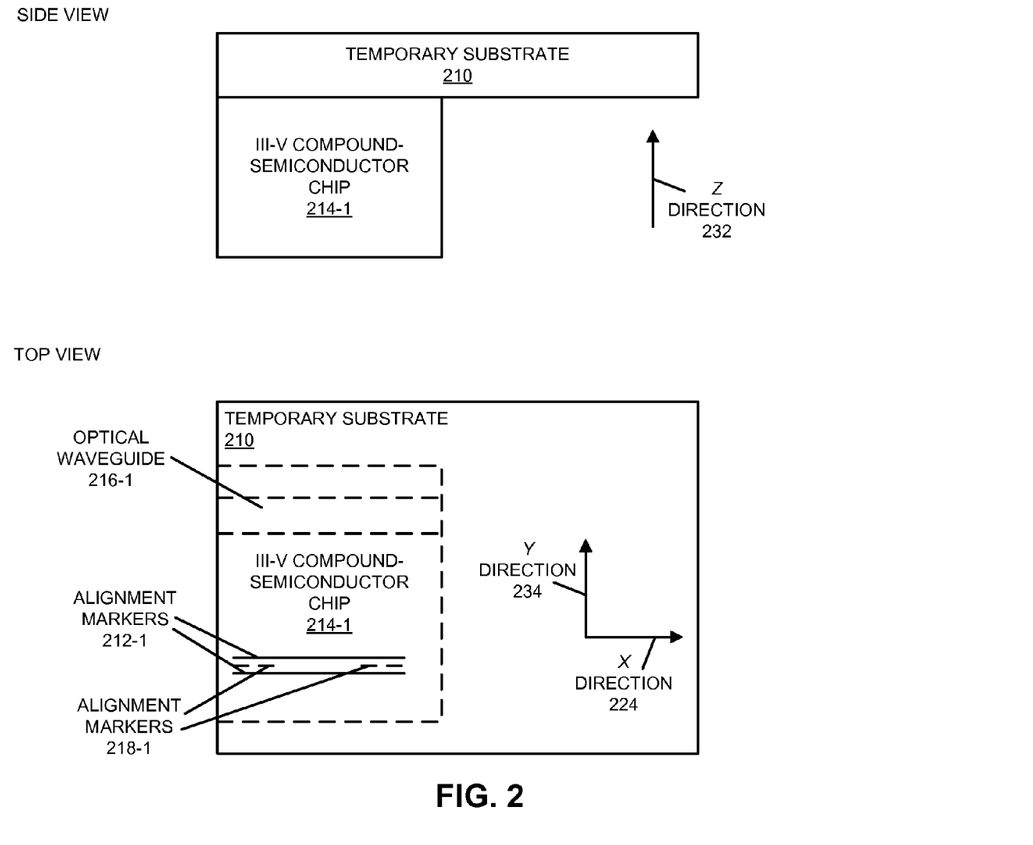
FIG. 2 is a block diagram illustrating an operation in the method of FIG. 1 in accordance with an embodiment of the present disclosure.

FIG. 2 presents a block diagram illustrating operation 110 in method 100 (FIG. 1). In particular, a transparent mask (which may be wafer-sized or chip-sized) with accurate alignment markers 212 (e.g., Verniers) may be used as temporary substrate 210. A III-V compound-semiconductor chip 214-1 (i.e., the first optical device) with one or more predefined optical waveguides (such as optical waveguide 216-1) and matching alignment markers 218-1, and a known epitaxial stack-up may be aligned and attached to temporary substrate 210 with temporary adhesive. In some embodiments, the one or more optical waveguides on the III-V compound-semiconductor chip are used as the matching alignment markers.

Figure 3:
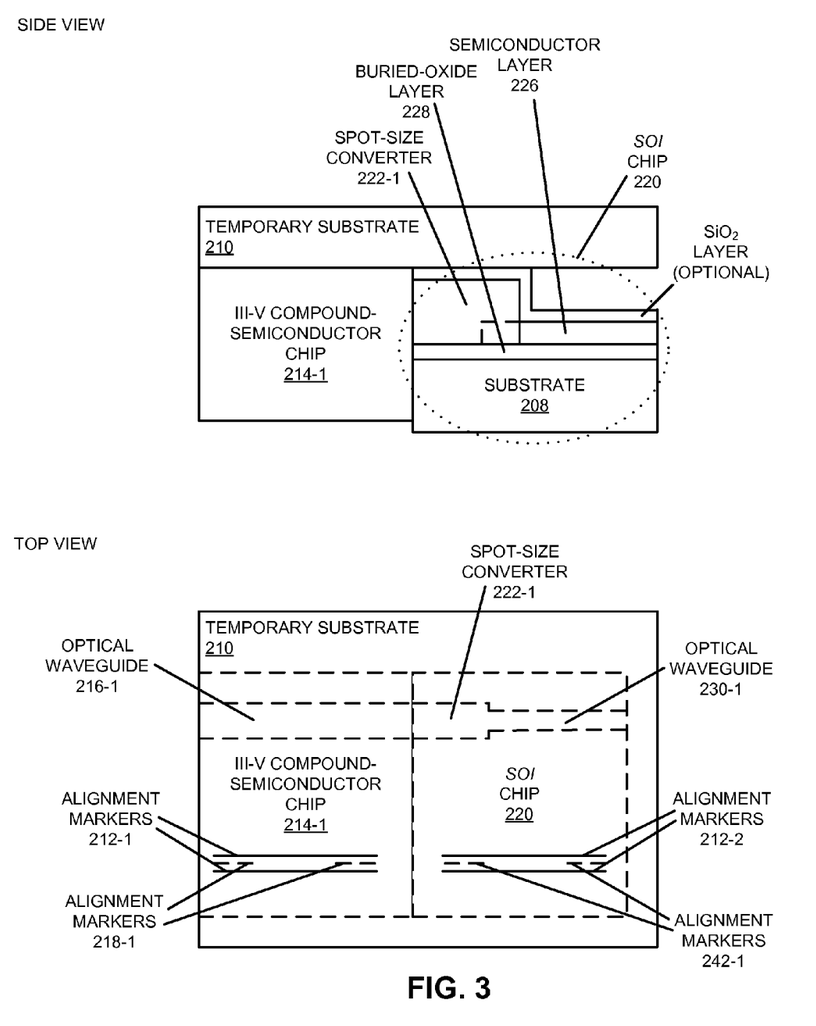
FIG. 3 is a block diagram illustrating an operation in the method of FIG. 1 in accordance with an embodiment of the present disclosure.

FIG. 3 presents a block diagram illustrating operation 114 in method 100 (FIG. 1). In this operation, a SOI chip 220 or wafer (i.e., the second optical device) with one or more inverse-taper based spot-size converters (such as spot-size converter 222-1) and a coupling edge (which may be created using the backside etching-assisted cleaving technique of FIG. 10) is then aligned and attached to temporary substrate 210 and against III-V compound-semiconductor chip 214-1 with a minimal gap between the SOI chip and the III-V compound-semiconductor chip, which aligns these chips along an x direction 224 (FIG. 2) in a plane of the optical waveguides in the chips. Note that the one or more spot-size converters may allow the alignment tolerance in the alignment process to be relaxed. Moreover, SOI chip 220 may have: a silicon substrate 208, a silicon semiconductor layer 226 with a thickness between 100 nm and 3 μm, a buried-oxide layer 228 with a thickness between 0.3 and 3 μm (such as 0.8 μm), and an optional silicon-dioxide ($SiO_2$) layer. Furthermore, note that the one or more spot-size converters may have an index of refraction between the index of refraction of the optional silicon-dioxide layer and the index of refraction of silicon semiconductor layer 226.

By aligning to common temporary substrate 210, the one or more optical waveguides on III-V compound-semiconductor chip 214-1 are automatically aligned with one or more silicon optical waveguides (such as optical waveguide 230-1) laterally through the one or more spot-size converters. Moreover, by controlling the layer thickness of the III-V compound-semiconductor epitaxial stack-up during growth, the center of the optical mode of the one or more III-V compound-semiconductor optical waveguides may be accurately known. In addition, by controlling the core and cladding thickness of the one or more optical waveguides in SOI chip 220, the one or more spot-size converters may match the center of the optical mode in the one or more III-V compound-semiconductor optical waveguides. Note that temporary substrate 210 may have a high-quality polished and flat surface, so that if several chips (III-V compound-semiconductor chips and SOI chips) are attached to it, their attached interfaces or edges with optical waveguides form an ideal plane, while their optical waveguides are simultaneously (and passively) vertically aligned along a z direction 232 (FIG. 2). Consequently, attaching to common temporary substrate 210 takes care of the vertical alignment of the optical waveguides. Therefore, by combining the use of photolithographically defined alignment markers 212, 218-1 (FIGS. 2) and 242-1 (on SOI chip 220) with accurate layer thicknesses (by controlling material growth and deposition), the complex six-axis alignment for edge coupling can be simplified to a one-axis alignment (i.e., with one degree of freedom) along a y direction 234 (FIG. 2) in the plane of the optical waveguides in the chips. This alignment along y direction 234 (FIG. 2) may involve active alignment (e.g., using flip-chip or alignment equipment) based on alignment markers 212, 218-1 (FIGS. 2) and 242-1. As noted previously, this alignment may be facilitated if temporary substrate 210 is optically transparent.

Figure 4:
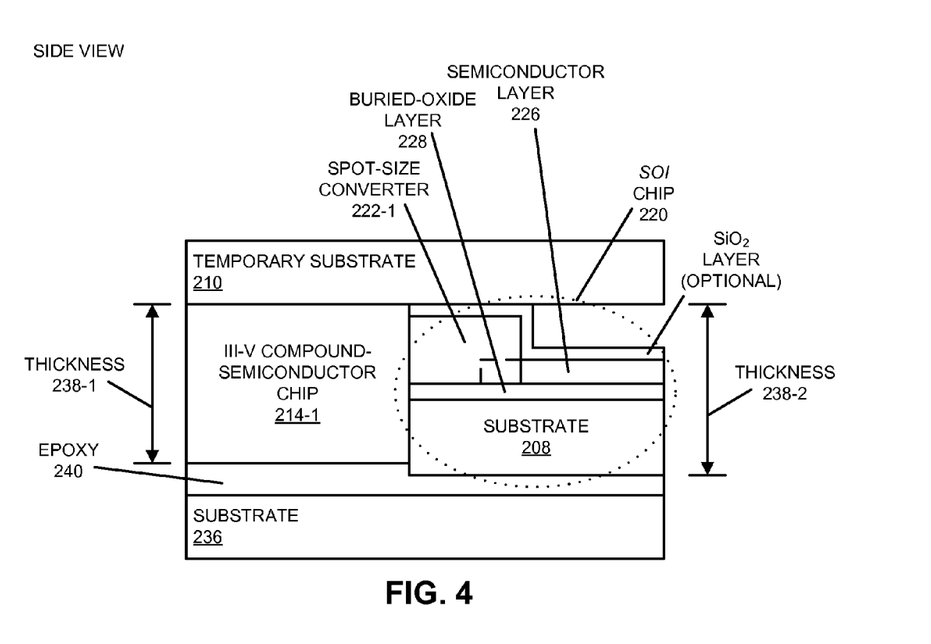
FIG. 4 is a block diagram illustrating an operation in the method of FIG. 1 in accordance with an embodiment of the present disclosure.

FIG. 4 presents a block diagram illustrating operation 116 in method 100 (FIG. 1). In particular, the aligned III-V compound-semiconductor chip 214-1 and SOI chip 220 on temporary substrate 210 are attached to a permanent substrate 236 (e.g., silicon), which may function as a thermal sink. Because III-V compound-semiconductor chip 214-1 and the SOI chip 220 (or wafer) may have different thicknesses 238, an epoxy 240 with a high thermal conductivity can be used to: fill gaps, compensate for chip and wafer thickness variations, and provide mechanical bonding.

Figure 5:
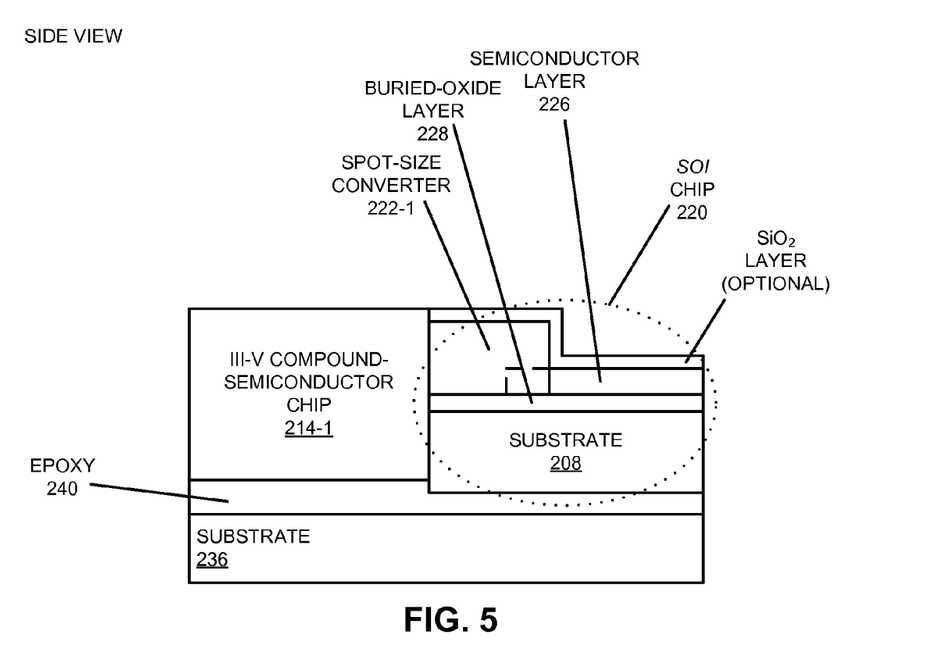
FIG. 5 is a block diagram illustrating an operation in the method of FIG. 1 in accordance with an embodiment of the present disclosure.

FIG. 5 presents a block diagram illustrating operation 118 in method 100 (FIG. 1). In this operation, temporary substrate 210 is removed to realize the co-planar hybrid III-V compound semiconductor-silicon optical source.

In some embodiments of the fabrication technique, SOI chip 220 (or wafer) may be aligned and attached to temporary substrate 210 first, and then aligned and attached to III-V compound-semiconductor chip 214-1. This fabrication technique may also be used with III-V compound-semiconductor chips without predefined optical waveguides. In these embodiments, SOI chip 220 (or wafer) is first aligned and attached to temporary substrate 210. Then, the III-V compound-semiconductor chip may be attached against SOI chip 220 (or wafer) without the need for accurate lateral alignment. After temporary substrate 210 is removed and the co-planar hybrid chip (or wafer) is obtained, compound-semiconductor optical waveguides can be processed using alignment markers 242-1 (FIG. 3) on SOI chip 220. By leveraging the accuracy of photolithography, this may allow precise alignment between the compound-semiconductor optical waveguides and the SOI optical waveguides.

Figure 6:
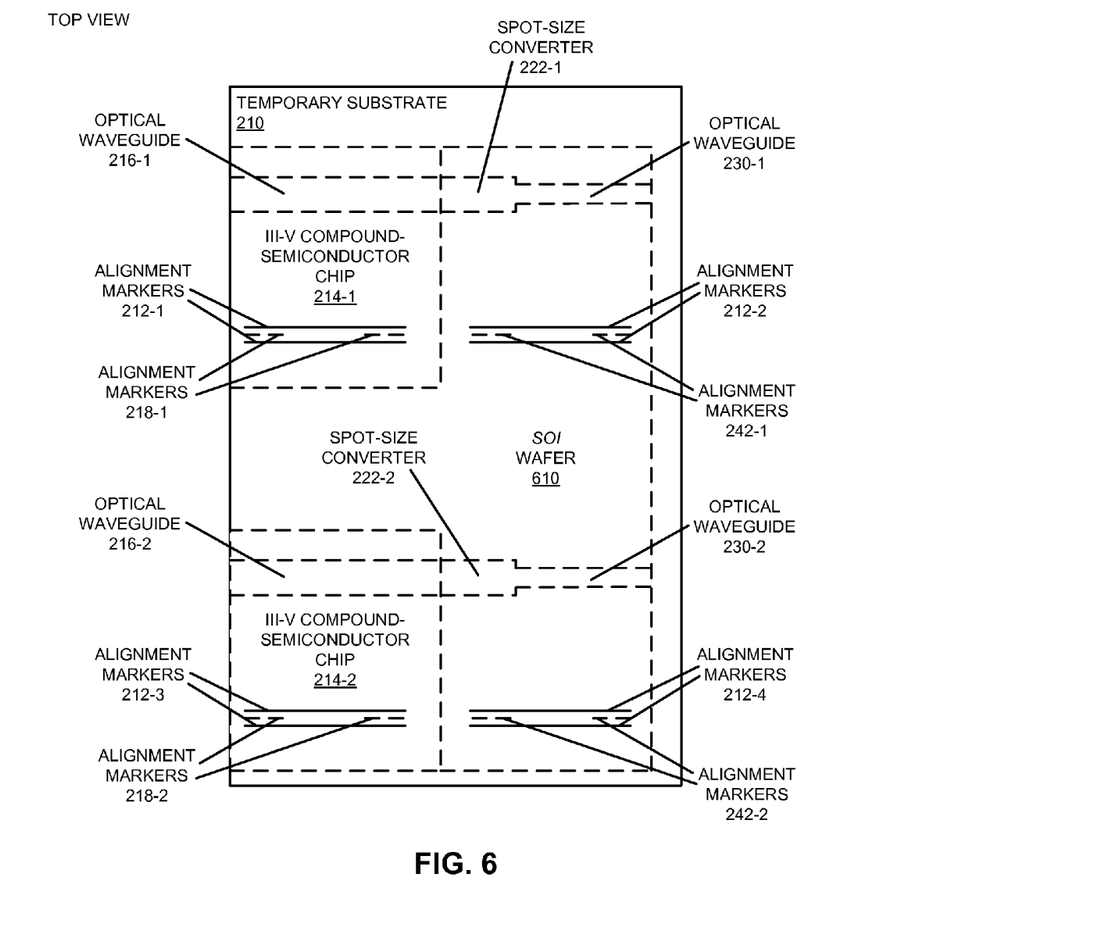
FIG. 6 is a block diagram illustrating fabrication of a hybrid optical source in accordance with an embodiment of the present disclosure.

As noted previously, multiple III-V compound-semiconductor chips can be integrated onto the same SOI wafer using the fabrication technique. As shown in FIG. 6, which presents a block diagram illustrating fabrication of a hybrid optical source, multiple integration sites (holes) can be created at wafer scale using the backside etching-assisted cleaving technique (which is described further below with reference to FIG. 10). SOI wafer 610 with integration holes may be first aligned and attached to temporary substrate 210 with alignment markers. Then, III-V compound-semiconductor chips 214 may be aligned and attached to temporary substrate 210 abutting the cleaved edges of SOI wafer 610. In these embodiments, compound-semiconductor chips 214 may be intentionally thicker than SOI wafer 610. After temporary substrate 210 has been removed, SOI wafer 610 with embedded co-planar III-V compound-semiconductor chips 214 as islands is obtained, which can then be post-processed simultaneously at wafer scale and then singulated (thus, the co-planar hybrid optical source may be fabricated prior to singulating the first optical device and the second optical device from wafers). This approach can allow multiple instances of the hybrid optical source to be fabricated using a wafer-scale version of the fabrication technique.

Figure 7:
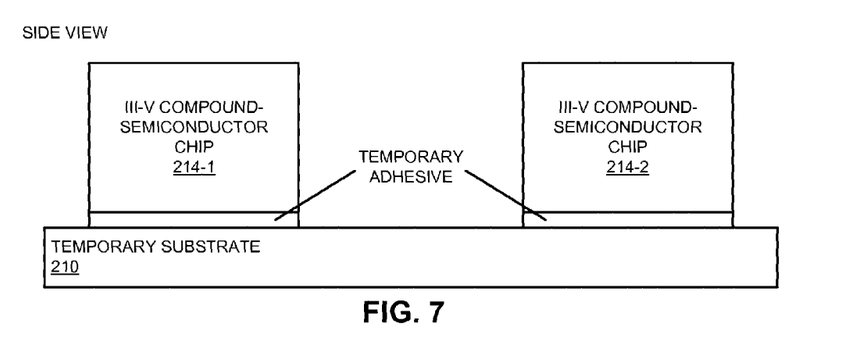
FIG. 7 is a block diagram illustrating wafer-scale integration of a hybrid optical source in accordance with an embodiment of the present disclosure.
Figure 8:
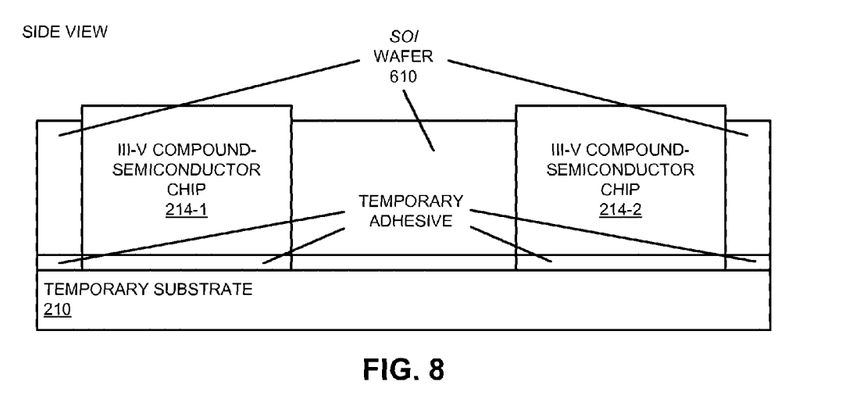
FIG. 8 is a block diagram illustrating wafer-scale integration of a hybrid optical source in accordance with an embodiment of the present disclosure.
Figure 9:
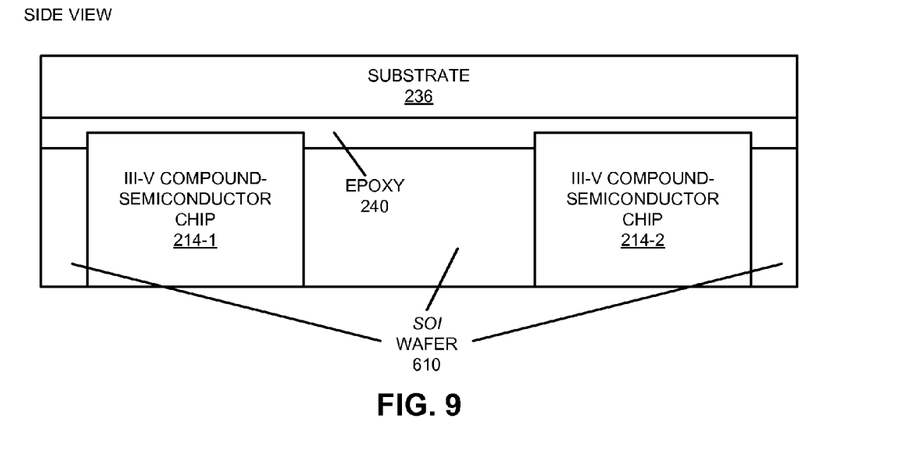
FIG. 9 is a block diagram illustrating wafer-scale integration of a hybrid optical source in accordance with an embodiment of the present disclosure.

This wafer-scale integration is further depicted in FIGS. 7-9. FIG. 7 presents a block diagram illustrating wafer-scale integration of a hybrid optical source. In FIG. 7, III-V compound-semiconductor chips 214 with proper edge processing (such as polishing, coating, etc.) are flip-chip aligned and temporarily adhered to a handler (i.e., temporary substrate 210) with alignment markers or features.

In FIG. 8, which presents a block diagram illustrating wafer-scale integration of a hybrid optical source, temporary substrate 210 with III-V compound-semiconductor chips 214 is then wafer attached to SOI wafer 610 with openings. This SOI wafer may include spot-sized converters that are faceted using the backside etching-assisted cleaving technique of FIG. 10. Note that vertical alignment in the hybrid optical source may be established with zero bondline.

In FIG. 9, which presents a block diagram illustrating wafer-scale integration of a hybrid optical source, a permanent substrate 236 is attached to the bottom of III-V compound-semiconductor chips 214 and SOI wafer 610 with thermally conducting epoxy. Then, temporary substrate 210 is removed.

As noted previously, the fabrication technique may involve cleaving SOI-based photonic chips (and/or wafers) using a cleaving technique based on backside silicon-substrate etching. In particular, the backside etching-assisted cleaving technique may create high-quality (i.e., low optical coupling loss) optical coupling facets for silicon-photonic chips with accurate facet positioning (e.g., with a position accuracy of several microns). This cleaving technique may leverage photolithography for accurate optical facet positioning, and may use backside substrate cleaving to achieve high-quality optical coupling facets for the SOI devices on the front side of the substrate. Because the cleaving technique may only require processing on the silicon substrate on the backside of the SOI chip, a well-understood silicon deep-etching process may be used regardless of the details of the front-side multi-layer structure, thereby improving the reproducibility and yield of the optical facets. Furthermore, the photolithographic pattern positioning of the optical facet location may allow an optical coupling facet to be fabricated wherever is needed on the chip (or wafer), and the cleaving may ensure the optical facet quality. As described previously with reference to FIGS. 6-9, this capability may allow the hybrid optical source to be fabricated at wafer scale, with high yield, low cost and high performance.

Figure 10:
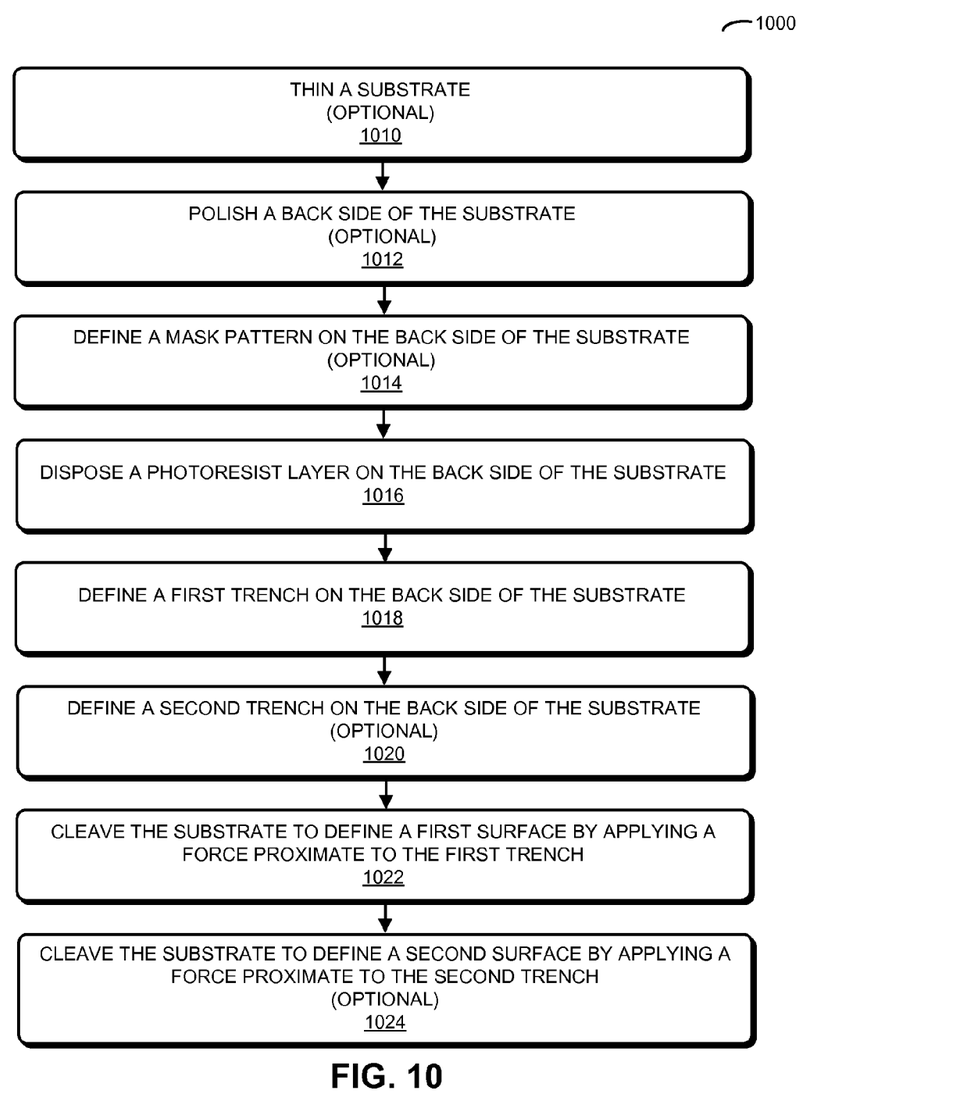
FIG. 10 is a flow diagram illustrating a method for cleaving a substrate in accordance with an embodiment of the present disclosure.

FIG. 10 presents a flow diagram illustrating a method 1000 for cleaving a substrate. During this method, a photoresist layer is disposed on a back side of a substrate (operation 1016) (such as a semiconductor die or a chip) having a thickness, where a buried-oxide layer is disposed on the front side of the substrate, and a semiconductor layer, which includes an optical waveguide having a symmetry axis, is disposed on the buried-oxide layer. The substrate, the buried-oxide layer and the semiconductor layer may comprise an SOI technology. Therefore, the semiconductor layer may include silicon.

Then, a first trench, having sides with a length, a width and a depth, is defined on the back side of the substrate (operation 1018), where the length is approximately perpendicular to the symmetry axis, and the depth is less than the thickness. Note that the first trench may be defined using a deep reactive ion etch (DRIE). (More generally, a variety of fabrication techniques may be used to define the first trench.) Examples of such a DRIE etching technique include the $CHF_3/SF_6$ Bosch process conducted at room temperature and the $SF_6/O_2$ cryogenic process. The first trench may have an aspect ratio of at least approximately ten. For example, the width may be 25-50 μm and the depth may be 60-100 μm short of the buried-oxide layer. Thus, a difference between the thickness and the depth may be less than 100 μm.

Next, the substrate is cleaved to define a first surface by applying a force proximate to the first trench (operation 1022). For example, the force may be just sufficient to cleave the substrate at the first trench along a crystallographic plane of the substrate. In some embodiments, the optical waveguide is designed to convey an optical signal having a wavelength (such as a carrier or fundamental wavelength), and the first surface has a roughness significantly less than the wavelength (ideally, the roughness may be zero). Moreover, the first surface may correspond to a crystal plane of the substrate. Furthermore, the first surface may extend across the semiconductor layer, the buried-oxide layer and the substrate. If a cladding layer (such as silicon dioxide or silicon nitride) is disposed on the semiconductor layer, the first surface may also extend across the cladding layer. The first surface may be located at: a corner of the substrate; a portion of a side of the substrate; and/or in a cavity defined, in part, by the first surface away from sides of the substrate.

In some embodiments, prior to disposing the photoresist layer (operation 1016), the thickness of the substrate is optionally thinned (operation 1010) to less than a predefined value, such as 300 μm. For example, the thickness may be thinned from 800-900 μm down to 100-200 μm. This substrate thinning may reduce the amount of DRIE needed, and may facilitate a particular aspect ratio of the resulting etched backside trench. Alternatively or additionally, prior to disposing the photoresist layer (operation 1016), a mask pattern is optionally defined on the back side of the substrate (operation 1014), where locations of the photoresist on the back side of the substrate are determined by the mask pattern. For example, the mask pattern may include a sufficiently thick silicon-dioxide layer deposited using plasma enhanced chemical vapor deposition or another fabrication technique. The mask pattern may be used to pattern the photoresist to facilitate defining the trench. Moreover, prior to defining the mask pattern (operation 1014), the back side of the substrate may be optionally polished (operation 1012), e.g., using chemical mechanical polishing.

In some embodiments of methods 100 (FIG. 1) and/or 1000, there are additional or fewer operations. For example, a second trench, having sides with a length, a width and a depth, may be defined on the back side of the substrate (operation 1020), where the length is approximately parallel to the symmetry axis, and the depth is less than the thickness. In these embodiments, the substrate may be cleaved to define a second surface by applying a force proximate to the second trench (operation 1024). The second surface may be approximately perpendicular to the first surface. Note that the second surface may have a roughness significantly less than the wavelength. Moreover, the second surface may correspond to a second crystal plane of the substrate.

While the preceding discussion used etching as an illustration of a technique for defining the first and/or the second trench, more generally the cleaving technique, as well as the fabrication technique, may involve an additive process (i.e., one in which material is deposited or disposed on a surface) and/or a subtractive process (i.e., one in which material is removed from a surface).

Furthermore, while the preceding embodiments illustrated the use of one or more spot-sized converters on the SOI chip (or wafer) in the hybrid optical source, in other embodiments where the optical mode size of the SOI optical waveguide is larger than that of the III-V compound-semiconductor optical waveguide mode, the one or more spot-sized converters may be used on the compound-semiconductor chip. This may occur when the SOI chip has a thicker silicon semiconductor layer, such as 3 μm silicon semiconductor layer. Thus, the fabrication technique may facilitate co-planar hybrid integration of a III-V compound-semiconductor chip with a variety of SOI platforms.

Additionally, the order of the operations in methods 100 (FIG. 1) and/or 1000 may be changed, and/or two or more operations may be combined into a single operation.

Figure 11:
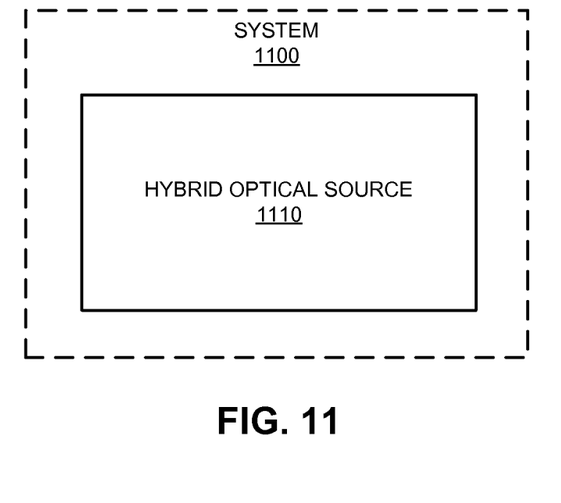
FIG. 11 is a block diagram illustrating a system that includes a hybrid optical source in accordance with an embodiment of the present disclosure.

We now describe embodiments of the system. FIG. 11 presents a block diagram illustrating a system 1100 that includes a hybrid optical source 1110, such as a hybrid optical source fabricated using methods 100 (FIG. 1) and/or 1000 (FIG. 10). System 1100 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a tablet computer, a supercomputer, a network-attached-storage (NAS) system, a storage-area-network (SAN) system, and/or another electronic computing device. Note that a given computer system may be at one location or may be distributed over multiple, geographically dispersed locations.

System 1100 may include fewer components or additional components. Moreover, the substrates may include: a semiconductor die (such as silicon), a ceramic, an organic material and/or glass.

Although the optical devices, the hybrid optical source and the system are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed. In addition, functionality in the preceding embodiments may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A method for fabricating a co-planar hybrid optical source, wherein the method comprises:
    disposing a temporary substrate having alignment markers on a first optical device having a first semiconductor substrate, wherein the alignment markers are aligned with a first optical waveguide in the first optical device;
    attaching a second optical device having a second semiconductor substrate to the temporary substrate, wherein the alignment markers are used to align the first optical waveguide with a second optical waveguide in the second optical device, and wherein the second semiconductor substrate is different than the first semiconductor substrate, wherein, prior to attaching the second optical device to the temporary substrate:
        disposing a photoresist layer on a back side of the second semiconductor substrate, wherein the second semiconductor substrate has a thickness;
        defining a trench, having sides with a length, a width and a depth, in the second semiconductor substrate, wherein the length is approximately perpendicular to a symmetry axis of the second optical waveguide, and wherein the depth is less than the thickness; and
        cleaving the second semiconductor substrate to define a surface by applying a force proximate to the trench, wherein the surface defines, in part, a cavity within the second semiconductor substrate;
    coupling the first optical device and the second optical device to a substrate; and
    removing the temporary substrate.

2. The method of claim 1, wherein the temporary substrate includes one of: photoresist, and epoxy.

3. The method of claim 1, wherein the temporary substrate is optically transparent.

4. The method of claim 1, wherein the first optical waveguide is optically butt coupled to the second optical waveguide.

5. The method of claim 1, wherein at least one of the first optical waveguide and the second optical waveguide includes a spot-size converter to expand an optical mode of an optical signal conveyed in the first optical waveguide and the second optical waveguide.

6. The method of claim 1, wherein the first semiconductor substrate includes a III-V semiconductor.

7. The method of claim 1, wherein the second optical device includes:
    a buried-oxide layer disposed on the second semiconductor substrate; and
    a semiconductor layer disposed on the buried-oxide layer; and
    wherein the semiconductor layer includes the second optical waveguide.

8. The method of claim 7, wherein the second semiconductor substrate, the buried-oxide layer, and the semiconductor layer comprise a silicon-on-insulator technology.

9. The method of claim 1, wherein the second semiconductor substrate includes silicon.

10. The method of claim 1, wherein a thickness of the first optical device is less than a thickness of the second optical device.

11. The method of claim 1, wherein the temporary substrate aligns the first optical device and the second optical device in a direction perpendicular to a plane of the first semiconductor substrate.

12. The method of claim 1, wherein the first optical device and the second optical device are aligned in a first direction in a plane of the first semiconductor substrate by reducing a separation between adjacent edges of the first semiconductor substrate and the second semiconductor substrate.

13. The method of claim 12, wherein the first optical device and the second optical device are aligned in a second direction in the plane using the alignment markers.

14. The method of claim 1, wherein, prior to disposing the photoresist layer on the back side of the second semiconductor substrate, the method further comprises thinning the thickness to less than a predefined value.

15. The method of claim 1, wherein the trench is defined using a deep reactive ion etch.

16. The method of claim 1, wherein the second optical waveguide is designed to convey an optical signal having a wavelength; and
    wherein the surface has a roughness significantly less than the wavelength.

17. The method of claim 1, wherein the first optical device and the second optical device are coupled to the substrate using one of: epoxy, and conductive epoxy.

18. The method of claim 1, wherein the substrate includes one of: silicon, glass, plastic, and ceramic.

19. The method of claim 1, wherein multiple co-planar hybrid optical sources are fabricated prior to singulating each co-planar hybrid optical source from wafers.

* * * * *

UNITED STATES PATENT AND TRADEMARK OFFICE
CERTIFICATE OF CORRECTION

PATENT NO. : 9,618,709 B2
APPLICATION NO. : 14/060136
DATED : April 11, 2017
INVENTOR(S) : Zheng et al.

It is certified that error appears in the above-identified patent and that said Letters Patent is hereby corrected as shown below:

In the Specification

In Column 3, Lines 30-40, delete "Then, a trench, having sides with a length, a width and a depth, is defined in the second semiconductor substrate, where the length is approximately perpendicular to a symmetry axis of the second optical waveguide, and where the depth is less than the thickness. For example, the trench may be defined using a deep reactive ion etch. Next, the second semiconductor substrate is cleaved to define a surface by applying a force proximate to the trench. Note that prior to disposing the photoresist layer on the back side of the second semiconductor substrate, the thickness may be thinned to less than a predefined value, such as 300 μm." and insert the same on Column 3, Line 29, as a continuation of same paragraph.

In Column 5, Lines 40-45, delete "Additionally, the substrate may include: silicon, glass, plastic, and/or ceramic. To facilitate the coupling (operation 116) while maintaining the alignment, a thickness of the first optical device may be less than a thickness of the second optical device (as described further below with reference to FIGS. 6-9, this may also facilitate wafer-scale integration)." and insert the same on Column 5, Line 39, as a continuation of same paragraph.

In Column 7, Line 39, delete "(FIGS. 2)" and insert -- (FIG. 2) --, therefor.

In Column 7, Line 47, delete "(FIGS. 2)" and insert -- (FIG. 2) --, therefor.

In Column 8, Line 8, after "obtained," insert -- III-V --.

In Column 8, Line 12, after "between the" insert -- III-V --.

In Column 8, Line 27, after "embodiments," insert -- III-V --.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,618,709 B2

In Column 8, Lines 22-37, delete "FIG. 10). SOI wafer 610 with integration holes may be first aligned and attached to temporary substrate 210 with alignment markers. Then, III-V compound-semiconductor chips 214 may be aligned and attached to temporary substrate 210 abutting the cleaved edges of SOI wafer 610. In these embodiments, compound-semiconductor chips 214 may be intentionally thicker than SOI wafer 610. After temporary substrate 210 has been removed, SOI wafer 610 with embedded co-planar III-V compound-semiconductor chips 214 as islands is obtained, which can then be post-processed simultaneously at wafer scale and then singulated (thus, the co-planar hybrid optical source may be fabricated prior to singulating the first optical device and the second optical device from wafers). This approach can allow multiple instances of the hybrid optical source to be fabricated using a wafer-scale version of the fabrication technique." and insert the same on Column 8, Line 21, as a continuation of same paragraph.

In Column 10, Line 39, after "the" insert -- III-V --.